US012469984B2

(12) United States Patent
Jang et al.

(10) Patent No.: US 12,469,984 B2
(45) Date of Patent: Nov. 11, 2025

(54) INTEGRATED AND PHASE-COMPENSATED BASE STATION ANTENNA PHASE SHIFTER AND CALIBRATION BOARD

(71) Applicant: John Mezzalingua Associates, LLC, Liverpool, NY (US)

(72) Inventors: Taehee Jang, Allen, TX (US); Niranjan Sundararajan, Clay, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 172 days.

(21) Appl. No.: 18/028,362

(22) PCT Filed: Sep. 24, 2021

(86) PCT No.: PCT/US2021/051878

§ 371 (c)(1),
(2) Date: Mar. 24, 2023

(87) PCT Pub. No.: WO2022/072227

PCT Pub. Date: Apr. 7, 2022

(65) Prior Publication Data

US 2023/0411868 A1 Dec. 21, 2023

Related U.S. Application Data

(60) Provisional application No. 63/084,889, filed on Sep. 29, 2020.

(51) Int. Cl.
*H01Q 21/06* (2006.01)
*H01Q 1/24* (2006.01)
(Continued)

(52) U.S. Cl.
CPC .......... *H01Q 21/062* (2013.01); *H01Q 1/246* (2013.01); *H01Q 21/0025* (2013.01); *H01Q 21/24* (2013.01)

(58) Field of Classification Search
CPC .......... H01Q 1/246; H01Q 3/267; H01Q 3/32; H01Q 21/0025; H01Q 21/062; H01Q 21/08; H01Q 21/24
See application file for complete search history.

(56) References Cited

U.S. PATENT DOCUMENTS

2002/0126059 A1* 9/2002 Zimmerman .......... H01Q 21/08 343/757
2009/0270051 A1 10/2009 Choi et al.
(Continued)

FOREIGN PATENT DOCUMENTS

CN 1392628 A 1/2003
JP 2003124723 A 4/2003
(Continued)

OTHER PUBLICATIONS

International Search Report and Written Opinion, dated Jan. 11, 2022, received in connection with International Patent Application No. PCT/US2021/051878.
(Continued)

*Primary Examiner* — Dameon E Levi
*Assistant Examiner* — Leah Rosenberg
(74) *Attorney, Agent, or Firm* — Meunier Carlin & Curfman LLC

(57) ABSTRACT

Disclosed is an antenna having a plurality of radiator columns and an integrated phase shifter/calibration board. The radiator columns have radiator clusters that may be differentially phase to provide beam tilt. The input traces of each of the phase shifters is capacitively coupled to a Wilkinson power divider that sums the power of all the input signals, thereby providing a calibration function. The output traces of each of the phase shifters has a designated meander
(Continued)

pattern that provides phase alignment for all the output signals to prevent phase mismatches between signals fed to the radiator clusters.

9 Claims, 5 Drawing Sheets

(51) Int. Cl.
*H01Q 21/00* (2006.01)
*H01Q 21/24* (2006.01)

(56) References Cited

U.S. PATENT DOCUMENTS

| | | | | |
|---|---|---|---|---|
| 2018/0316092 | A1* | 11/2018 | Cai | H01P 5/185 |
| 2019/0334636 | A1* | 10/2019 | Li | G01R 29/10 |

FOREIGN PATENT DOCUMENTS

| | | | |
|---|---|---|---|
| WO | 2019178224 | | 9/2019 |
| WO | 2019209903 | A1 | 10/2019 |

OTHER PUBLICATIONS

Extended European Search Report in connection to EP Application No. 21876240.9, dated Oct. 9, 2024, 8 pages.

* cited by examiner

INTEGRATED AND PHASE-COMPENSATED BASE STATION ANTENNA PHASE SHIFTER AND CALIBRATION BOARD

This application is a U.S. National Stage application filed under 35 U.S.C. § 371 of PCT/US2021/051878 filed Sep. 24, 2021, which claims the benefit of priority to U. S. Provisional Application No. 63/084,889 filed Sep. 29, 2020, each of which is hereby incorporated herein by reference in its entirety.

BACKGROUND OF THE DISCLOSURE

Field of the Invention

The present invention relates to wireless communications, and more particularly to cellular antennas that provide beam forming and MIMO (Multi Input-Multi Output) in higher frequency bands.

Related Art

The advent of new high frequency bands for use in cellular communications brings both opportunities and technical challenges. In addition to the traditional low band (LB) and mid band (MB) frequency regimes (617-894 MHz and 1695-2690 MHz, respectively), the introduction of C-Band and CBRS (Citizens Broadband Radio Service) provides additional spectrum of 3.4-4.2 GHz. The smaller sizes of individual radiators (corresponding to higher frequencies) of CBRS and the C-Band enables the construction of array faces within traditional cellular macro antennas that facilitate features such as 4×4 MIMO (Multiple Input Multiple Output) and 8T8R (8-port Transmit, 8-port Receive) with beamforming.

A challenge arises in implementing 8T8R beamforming and 4×4 MIMO within an antenna in that the performance of these featured depends greatly on phase coherence between the signals on the ports. Any phase mismatch can seriously degrade the performance of the antenna. For example, a phase mismatch is introduced to one of the port signals can impart an insertion loss to the signals provided to the antenna radiators. This not only decreases the efficiency of the antenna but also degrades the quality of the gain pattern intended by the beamforming weights applied to the different columns of radiators. This challenge becomes exacerbated with higher frequencies in that minor phase mismatches due to cable length differences within the antenna. For example, in the C-Band, a 1 mm difference in cable length can impart a 10 degree phase mismatch between signals. Further, these phase errors due to cable length mismatches are cumulative with each set of cables introduced into the signal paths. Given that the precision of typical cable cutting machines is around +/−0.5 mm, these errors can compound. Further, for conventional antennas, the cables for each given port may be of different length, which not only complicates the manufacturing process and increases manufacturing costs, but also introduces more risk in phase mismatches from improper cable allocation that can lead to lack of performance consistencies.

Accordingly, what is needed is an integrated antenna calibration and phase shifter board that compensates for phase differences, that reduces the number of cables required in the signal path of each signal port, and simplifies manufacturing by enabling cables of identical length across multiple ports' signal paths.

SUMMARY OF THE DISCLOSURE

An aspect of the present disclosure involves an antenna. The antenna comprises a plurality of radiator columns, each radiator column having a plurality of radiator clusters; a phase shifter/calibration board having a plurality input ports and a plurality of phase shifters, each of the plurality of phase shifters is coupled to a corresponding input port via an input trace, each input trace is capacitively coupled to provide a representative power signal to one of a plurality of power dividers, wherein each phase shifter has a plurality of phase shifter output traces having an output port, each of the output ports is coupled to a corresponding radiator cluster of a corresponding radiator column, wherein a subset of the plurality of phase shifter output traces have a designated meander pattern that collectively provides phase matching between the output ports, wherein the plurality of power dividers sums the plurality of representative power signals into a single calibration signal; and a plurality of RF cables, each of the plurality of RF cables couples a given phase shifter output port to its corresponding radiator cluster of its corresponding radiator column, wherein the plurality of RF cables have the same length.

DESCRIPTION OF EXEMPLARY EMBODIMENTS

Figure 1:
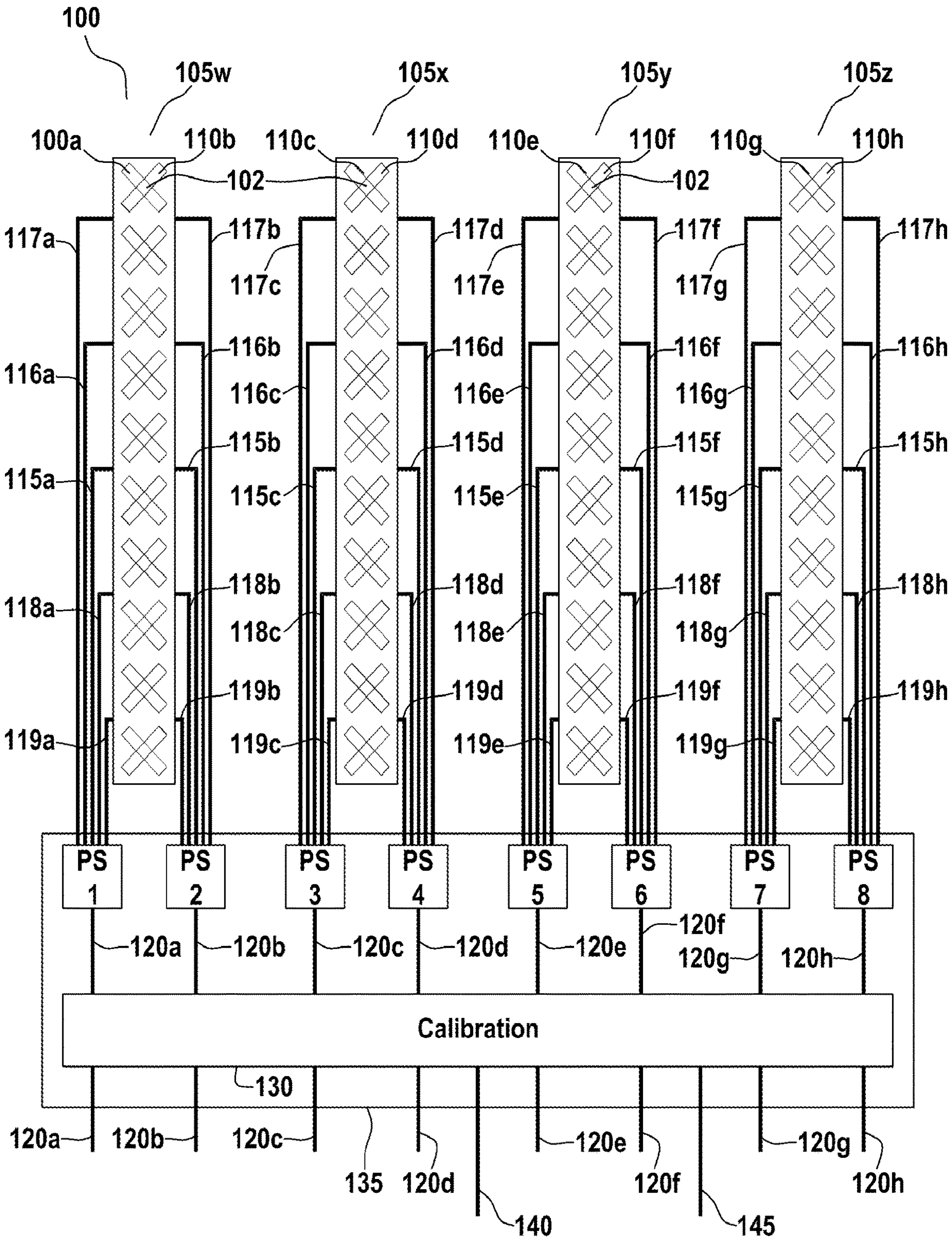
FIG. 1 illustrates an exemplary 8T8R array face coupled to an integrated phase compensated calibration board according to the disclosure.

FIG. 1 illustrates an exemplary array assembly according to the disclosure. Array face assembly 100 includes a plurality of radiator columns 105*w*, 105*x*, 105*y*, and 105*z*, each having a plurality of crossed radiator pairs 102, and an integrated phase compensated calibration board 135 (hereinafter phase/calibration board 135). In this example, radiator column 105*w* has ten radiator pairs 102, each radiator pair 102 having a dipole 110*a* of a first polarization and a crossed dipole 110*b* of a second polarization that is orthogonal to the first polarization; similarly, radiator column 105*x* has ten radiator pairs 102, each radiator pair 102 having a dipole 110*c* of the first polarization and a crossed dipole 110*d* of the second polarization; radiator column 105*y* has ten radiator pairs 102, each radiator pair 102 having a dipole 110*e* of the first polarization and a crossed dipole 110*f* of the second polarization; and radiator column 105*z* also has ten radiator pairs 102, each radiator pair 102 having a dipole 110*g* of the first polarization and a crossed dipole 110*h* of the second polarization. In this example, the arrangement of radiator columns 105*w-z*, each having two sets of orthogonally polarized radiators 110 is consistent with an 8T8R array face. However, it will be understood that other array face configurations are possible and within the scope of the disclosure.

In this example, each radiator column 105*w-z* has ten crossed radiator pairs 102 that are divided into five clusters of two radiator pairs. Each cluster of two radiator pairs 102 has two signal feeds, one per polarization. Each cluster of two radiator pairs 102 may have, for each polarization, a signal splitter (not shown) that splits the RF signal from each of the two signal feeds to two balun circuits (not shown) for each polarization. Each balun circuit is disposed on a balun stem (not shown) that supports the dipoles 110 of the corresponding radiator pair 102. The signal feeds to each cluster of two radiator pairs 102 are coupled to outputs of phase shifters, as described below.

Phase/calibration board 135 has a plurality of phase shifters PS1-PS8, each of which correspond to a single set of dipoles 110*a-h* corresponding to a given polarization within a given radiator column 105*w-z*. For example, phase shifter PS1 has a signal input port 120*a*. Phase shifter PS1 may further have five output signal feeds: feed 115*a* that corresponds to the reference port (no phase shift imparted by phase shifter PS1) to the dipoles 110*a* of the center cluster of two radiator pairs 102 within radiator column 105*w*; feed 116*a* that corresponds to a first output of phase shifter PS1 that imparts a first phase shift to the signal from input port 120*a* that gets fed to the dipoles 110*a* of the cluster of two radiator pairs 102 distal and adjacent to the center cluster; feed 117*a* that corresponds to a second output of phase shifter PS1 that imparts a second phase shift to the signal from input port 120*a* that gets fed to the dipoles 110*a* of the cluster of two radiator pairs 102 at the distal end of radiator column 105*w*; feed 118*a* that corresponds to a third output of phase shifter PS1 that imparts a third phase shift to the signal from input port 120*a* that gets fed to the dipoles 110*a* of the cluster of two radiator pairs 102 proximal and adjacent to the center cluster; and feed 119*a* that corresponds to a fourth output of phase shifter PS1 that imparts a fourth phase shift to the signal from input port 120*a* that gets fed to the dipoles 110*a* of the cluster of two radiator pairs 102 at the proximal end of radiator column 105*w*.

Similarly, phase shifter PS2 has a signal input port 120*b* and five signal feeds 115*b*-119*b*, which provide signals to the dipoles 110*b* of the corresponding clusters of radiator pairs according to a signal connection similar to that of phase shifter 120*a* but for the orthogonal polarization within the same radiator column 105*w*. It will be understood that signal input ports 120*a* and 120*b* may corresponding to distinct and independent signals. It will also be understood that the connections of signal feeds 115*b*-119*b*, with their corresponding phases imparted by corresponding phase shifter PS2, may be similar as described above with respect to phase shifter PS1 and dipoles 110*a*.

Phase shifters PS3 and PS4 may be coupled to respective dipoles 110*c* and 110*d* of radiator column 105*x* in a manner similar to that described with respect to phase shifters PS1 and PS2 and radiator column 105*w*; phase shifters PS5 and PS6 may be coupled to respective dipoles 110*e* and 110*f* of radiator column 105*y* in a manner similar to that described with respect to phase shifters PS1 and PS2 and radiator column 105*w*; and phase shifters PS7 and PS8 may be coupled to respective dipoles 110*g* and 110*h* of radiator column 105*z* in a similar corresponding manner.

Having different clusters of dipoles 110*a-h* within a given radiator column 105*w-z* fed with signals such that each cluster's signal has a different phase shift imparted by corresponding phase shifter PS1-8 enables independent beam pointing of each signal input 120*a-h* along an axis parallel to the axis of radiator columns 105*w-z* according to conventional Remote Electrical Tilt methods.

Each of the phase shifters PS1-8 are coupled to the calibration segment 130 of phase/calibration board 135. Calibration segment 130, in addition to being coupled to each of the input signal ports 120*a-h*, provides a calibration output port 140 and a Bias-T port 145, which are described in further detail below.

Figure 2:
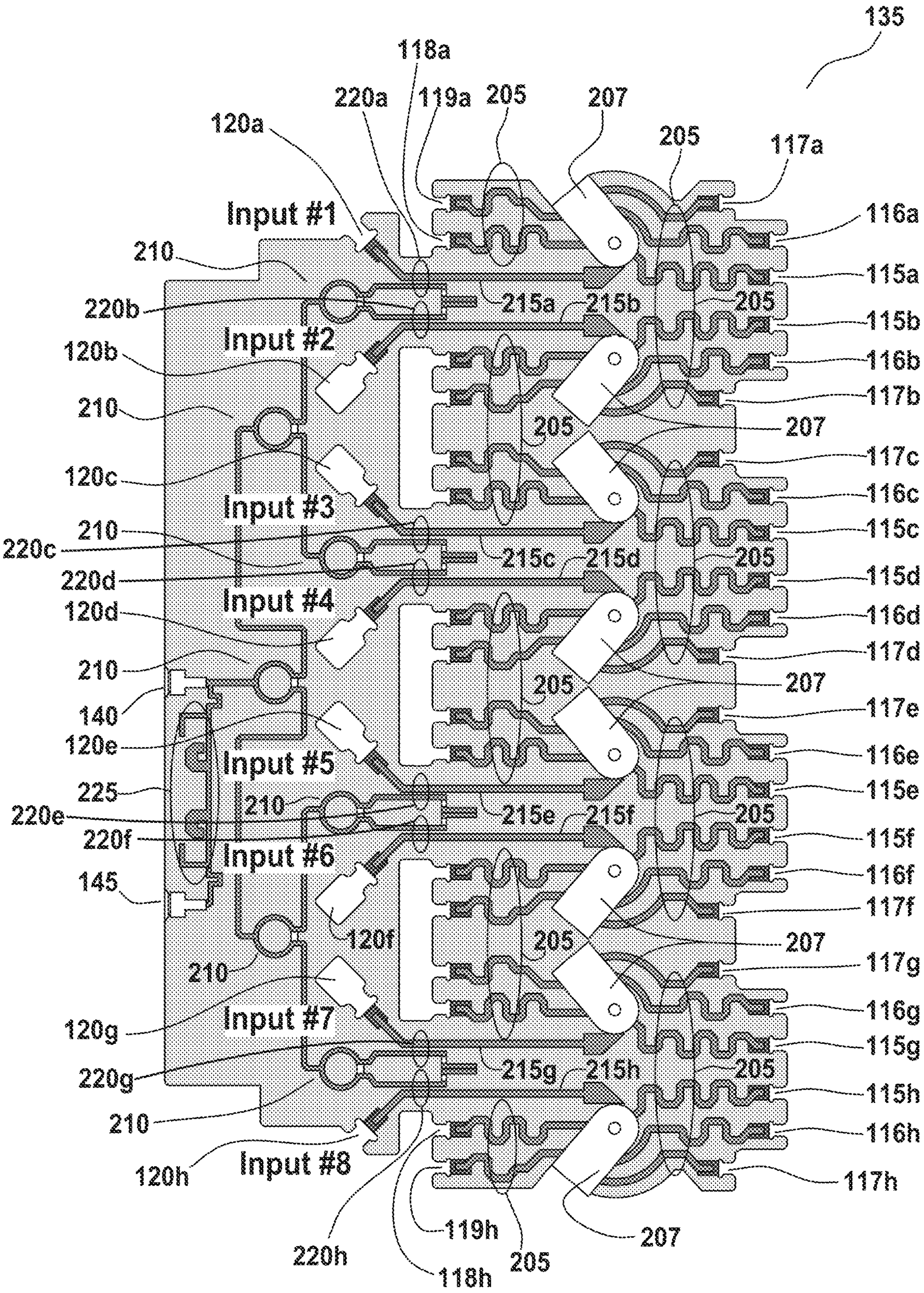
FIG. 2 illustrates an exemplary integrated phase shifter/calibration board according to the disclosure.

FIG. 2 illustrates an exemplary phase/calibration board 135 according to the disclosure. Phase/calibration board 135 has input signal ports 120*a-h*, each of which has an input trace 215*a-h* that couples to its corresponding reference port 115*a-h* (coupled to corresponding reference feed 115*a-h*) via the base of a corresponding phase shifter wiper arm 207. The input trace 215*a-h* coupled to corresponding signal ports 120*a-h* also couples to a Wilkinson power divider 210 at coupling point 220*a-h*. A Wilkinson power divider is an example of a power divider that might be used. Other power divider circuits may be used provided that they each tap into the signal at a given input trace 215*a-h* with minimal power loss and sum the powers of the tapped signals into a single signal. Examples include a two-way splitter without resistors, and a rat-race coupler, although these will not have the efficiency of a Wilkinson power divider.

Accordingly, each coupling point 220*a-h* provides the Wilkinson power divider 210 a copy of the signal present at input traces 215*a-h* with a 26 dB drop. In doing so, each signal at the input signal ports 120*a-h* are tapped (uniformly attenuated by 26 dB) in such a way that minimal signal power is extracted from the signals to be fed to radiator columns 105*w-z*. As illustrated, each successive Wilkinson power divider 210 sums the detected signal power tapped from input traces 215*a-h*, and the arrangement of cascaded Wilkinson power dividers 210 sums the power of tapped signals from input traces 215*a-h* according to the following combination: (((215*a*+215*b*)+(215*c*+215*d*))+((215*e*+215*f*)+(215*g*+215*h*))). The output of the apex Wilkinson Power Divider 210, which is coupled to calibration output port 140, is the summed signal power according to this relation.

In keeping with Wilkinson power divider theory, the signal of calibration trace 309 corresponding to input trace 215*a* (for example) is summed with the signal of calibration trace 309 corresponding to input trace 215*b*. Both calibration traces 309 are input to corresponding Wilkinson power divider 210 with a loss of −3 dB (half power) at each input port. Accordingly, given that the two signals are summed at the output of the Wilkinson power divider 210, the half-power losses at the input ports are restored by the summing of the two signals into a single output. This lossless operation, however, depends on the two signals at calibration traces 309 (and thus at input traces 215*a* and 215*b*) are equal in magnitude and phase. The lossless nature of operation of the Wilkinson power divider 210 applies for each level of their cascading topology. Accordingly, signal at calibration port 140 is a lossless combination of a 26 dB dropped representation of the signals at input traces 215*a-h* (and thus input ports 120*a-h*), assuming that all of the signals at input ports 120*a-h* are of equal magnitude and phase. However, if one or more of the signals at input ports 120*a-h* experiences a phase mismatch to the others, the cascaded Wilkinson power dividers in the summation path of the cascade topology are no longer lossless, and the signal level at calibration output port 140 will drop. Accordingly, a signal drop beyond 2 dB below the expected 26 dB drop may indicate a phase mismatch at one or more input port 120*a-h*.

Any phase mismatch between the signals at input ports 120*a-h* will result in a beamforming error. For example, a phase mismatch might be due to an RF cable carrying one of the input signals 120*a-h* being replaced by one having a different length. Regardless of how imparted, a phase mismatch leads to an increase in insertion loss at the relevant input trace 215*a-h*, which in turn leads to a drop in power at calibration output port 140. Another example might be the failure of one of the phase shifters PS1-8. This also would result in a drop in signal at the corresponding input trace 215*a-h*, which would in turn lead to a reduction of signal power at calibration output port 140.

A network operator or neutral host may deploy equipment that monitors signal power at calibration output port 140. If the signal power at calibration output port 140 drops below a predetermined threshold (indicating a phase mismatch or malfunction in the RF path of one of the input signals 120*a-h*) the operator or neutral host may either increase the power at a suspect mismatched input signal 120*a-h* or change the phase of a suspect mismatched input signal 120*a-h*. Either actions compensates for insertion loss.

Phase/calibration board 135 further includes a Bias-T circuit 225 with Bias-T output port 145. Bias-T circuit 225 filters out the sinusoidal components of the signal present at calibration output port 140 to provide a DC voltage output at Bias-T output port 145. This DC voltage may be used by components within the antenna in which array face 100 is integrated. For example, the DC voltage from Bias-T output port 145 may be used to power the Remote Electrical Tilt (RET) motors that drive the phase shifter wiper arms 207.

Figure 3A:
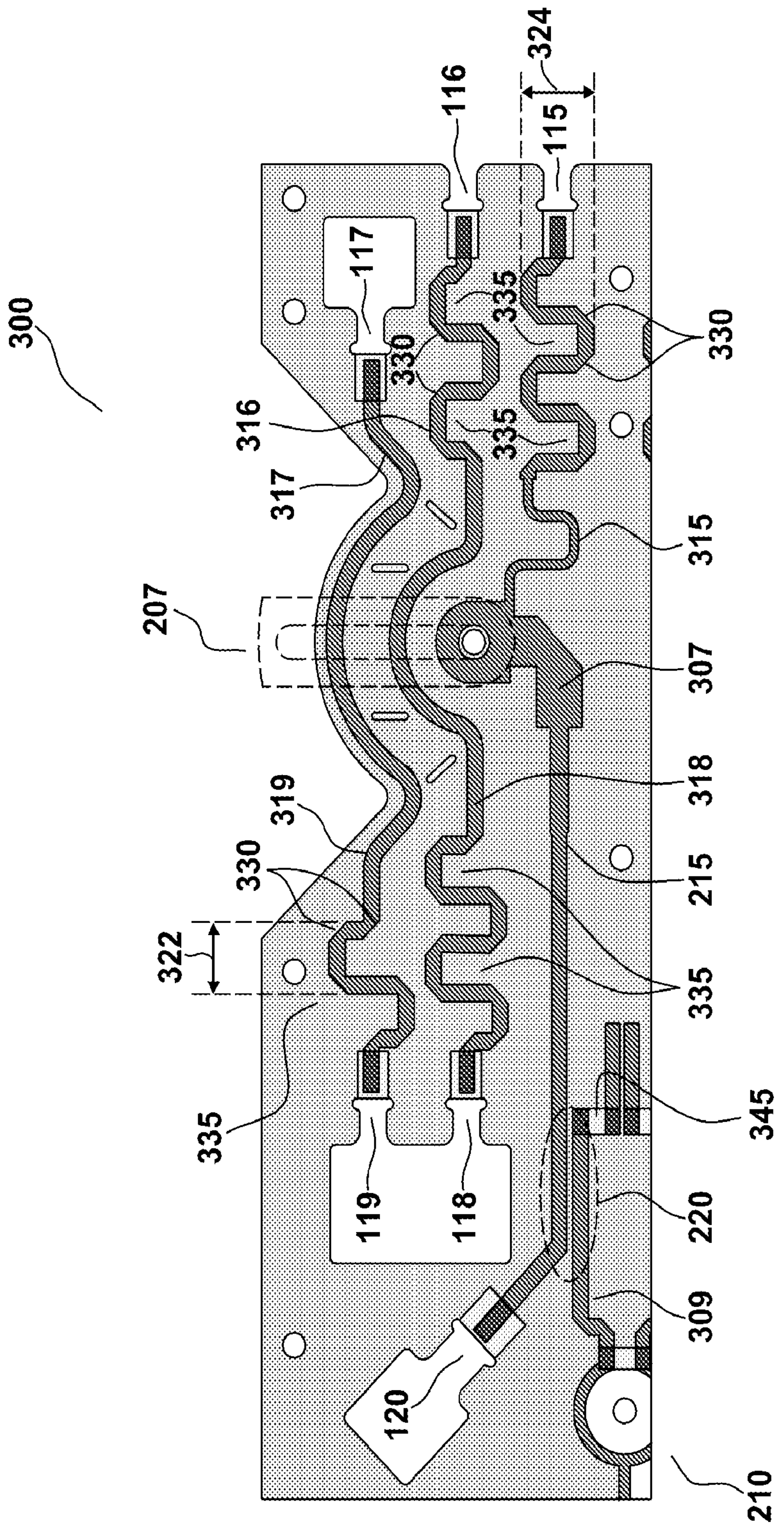
FIG. 3A illustrates an exemplary integrated phase shifter/calibration signal path according to the disclosure.

FIG. 3A illustrates an exemplary integrated phase shifter/calibration signal path 300 according to the disclosure. Phase shifter/calibration signal path 300 may be one of the eight signal paths illustrated in FIG. 2. Phase shifter/calibration signal path 300 has a signal input 120 and an output reference port 115 that corresponds to a central radiator pair cluster on a corresponding radiator column 105; a proximal end radiator cluster signal output 119 that corresponds to the "bottom" radiator pair cluster on the corresponding radiator column 105; a proximal inner radiator cluster signal output 118 that corresponds to the "lower" radiator pair cluster that is adjacent to the central radiator pair cluster; a distal end radiator signal output 117 that corresponds to the "upper" end radiator pair cluster on the corresponding radiator column 105; and a distal inner radiator cluster signal output 116 that corresponds to the "upper" radiator pair cluster that is adjacent to the central radiator pair cluster on the corresponding radiator column 105.

Figure 3B:
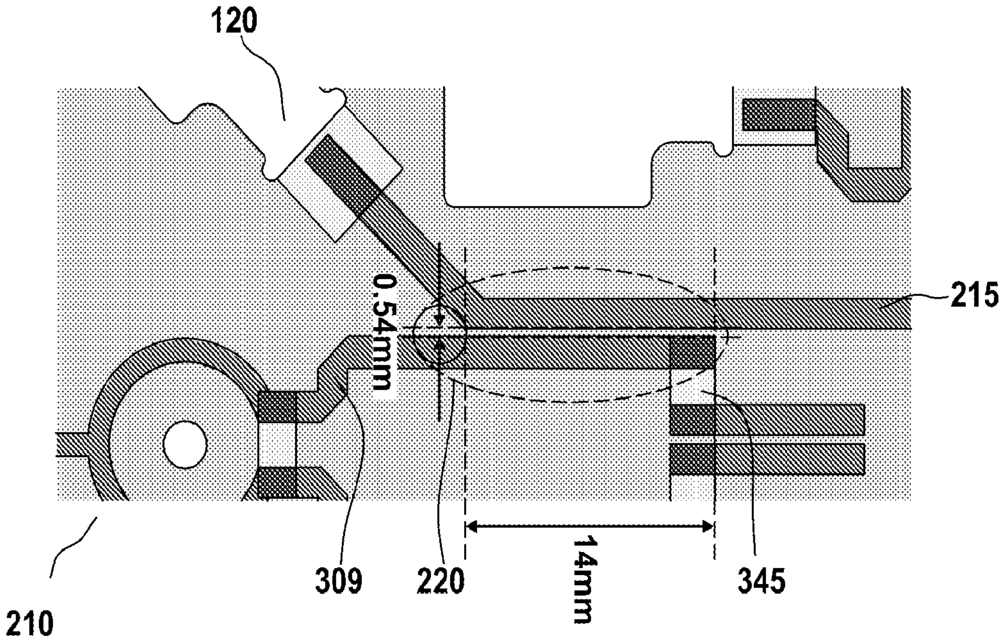
FIG. 3B is another illustration of the exemplary integrated phase shifter/calibration signal path of FIG. 3A, providing example dimensions for the coupling point between in input trace and a calibration trace.

FIG. 3B is a closer view of coupling point 220 of phase shifter/calibration signal path 300, providing exemplary dimensions. As illustrated, contiguous to signal input 120 is input trace 215, which capacitively couples to calibration trace 309 at coupling point 220. Input trace 215 couples to output reference port 115 via reference port trace 315, which is coupled to the phase shifter base conductor 307. The extent of the coupling at coupling point 220, which is tailored to couple with a 26 dB drop for the signal on calibration trace 309, may be controlled by the length over which calibration trace 309 is adjacent to input trace 215, and their proximity, at coupling point 220. In the example provided, the length over which calibration trace 309 is adjacent to input trace 215 may be 14 mm, and the two traces may be spaced apart at 0.54 mm. Calibration trace 309 is part of Wilkinson power divider 210, which includes a dissipating resistor 345, which provides cancelation of minor phase mismatches.

In addition to reference port trace 315, phase shifter/calibration signal path 300 has four output traces, each corresponding to signal outputs 116/117/118/119. For example, proximal end radiator cluster signal output 119 is coupled to output trace 319; and distal end radiator signal output 117 is coupled to output trace 317. Although output traces 319 and 317 may be formed of a single contiguous conductive trace, output trace 319 may be defined as beginning at the capacitive couple at phase shifter wiper arm 207 and extending in one direction; and output trace 317 may also be defined as beginning at the capacitive couple at phase shifter wiper arm 207 and extending in the opposite direction. Similarly, proximal inner radiator cluster signal output 118 is coupled to output trace 318; and distal inner radiator cluster signal output 116 is coupled to output trace 316. Further, although output traces 318 and 316 may be formed of a single contiguous conductive trace, output trace 318 may be defined as beginning at the capacitive couple at phase shifter wiper arm 207 and extending in one direction; and output trace 316 may also be defined as beginning at the capacitive couple at phase shifter wiper arm 207 and extending in the opposite direction.

Each output trace 315/316/317/318/319 may have a respective designated meander pattern that provides individual phase deltas. The individual phase deltas provide phase matching between signal outputs 115/116/117/118/119 to compensate for individual systemic phase mismatches. This enables the internal RF cables (not shown) between the phase shifters PS1-8 and radiator columns 105*w-z* to be formed of a single length, greatly simplifying the manufacture of the antenna. However, complications arise in providing meander patterns for output traces 315/316/317/318/319 due to possible coupling between meander features of a single output trace, as well as cross coupling between adjacent output traces.

For each output trace 315/316/317/318/319, phase matching control that minimizes internal coupling as well as cross coupling may involve tailored use of the following trace design features: number of meander turns 335; spacing of meander turns 322; width of meander turns 324, staggering of meander turns 335 for adjacent output traces; and length of chamfer 330. In the example illustrated in FIG. 3A, reference port trace 315 has six meander turns 335 between phase shifter base conductor 307 and signal output 115; output trace 316 has three meander turns 335; output trace 317 might not have a meander turn, which may be expected, given that the distal end radiator signal output 117 corresponds to the "upper" end radiator pair cluster on the corresponding radiator column 105 and is likely the furthest in distance from phase shifter/calibration signal path 300; output trace 318 has four meander turns 335; and output trace 319 has two meander turns 335.

The spacing of meander turns 322 should be sufficiently long to prevent coupling between parallel segments of the given individual output trace 315/316/317/318/319. If more phase delay is required, the width of meander turn 324 can be increased, but this may place the given output trace in sufficient proximity to an adjacent output trace to cause cross coupling. To mitigate this, the meander turns 335 of adjacent output traces may be staggered to reduce proximity. To further reduce the risk of cross coupling, chamfers 330 may be added at the corners of meander turns 335 to help maintain distance between adjacent output traces.

Figure 3C:
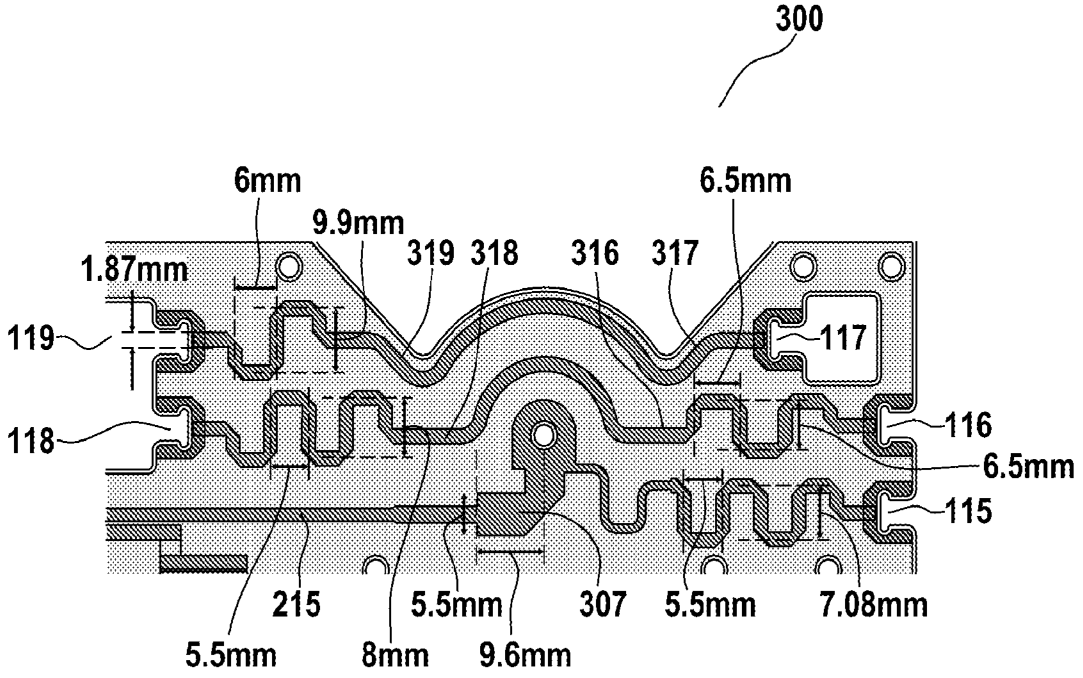
FIG. 3C is another illustration of the exemplary integrated phase shifter/calibration signal path of FIG. 3A, providing example dimensions for exemplary traces and meander turns according to the disclosure.

FIG. 3C provides example dimensions for the output traces 315/316/317/318/319, the widths of their meander turns 324, and their respective meander turn spacings 322.

Each of the output traces 315/316/317/318/319 may be formed of 1.4 mil Copper on a printed circuit board. Given that trace etching precision may be +/−3 mil, this offers considerable precision in adjusting the differential phases of each output trace to mitigate phase mismatch, relative to the +/−0.5 mm precision in RF cable length. With the systemic phase mismatches compensated as described herein, each of the RF cables (not shown) between signal outputs 115/116/117/118/119 and their respective radiator pair clusters may be of the same length. This may significantly reduce the complexity and cost of manufacture of the antenna in which exemplary array face 100 is deployed while mitigating phase mismatches that lead to beamforming errors.

Accordingly, an antenna with exemplary array face 100 provides the following capabilities and advantages. First, phase alignment is critical in 8T8R scenarios in which all radiator columns are used to form a broadcast beam (one per polarization) that can be tilted, to form a service beam that can be scanned as well as tilted. It enables an operator to identify failure of one or more phase shifters as well as to identify and compensate for externally-induced phase mismatch (change in cable with one of a different length). Additionally, uniformity in phase is built into the antenna by the combination of higher integration and phase alignment via designated meander patterns, eliminating the need for certain cables between the phase shifter and the calibration board as well as enabling the use of RF cables of a single length to couple the phase shifters to the corresponding radiator clusters, thereby reducing cost as well as eliminating another source of potential detrimental phase deltas.

What is claimed is:

1. An antenna, comprising:

a plurality of radiator columns, each radiator column having a plurality of radiator clusters;

a phase shifter/calibration board having a plurality of input ports and a plurality of phase shifters, each of the plurality of phase shifters is coupled to a corresponding input port via an input trace, each input trace is capacitively coupled to provide a representative power signal to one of a plurality of power dividers, wherein each phase shifter has a plurality of phase shifter output traces having an output port, each of the output ports is coupled to a corresponding radiator cluster of a corresponding radiator column, wherein a subset of the plurality of phase shifter output traces have a designated meander pattern that collectively provides phase matching between the output ports, wherein a first designated meander pattern is adjacent to a second designated meander pattern, wherein the first designated meander pattern and the second designated meander pattern include at least two turns of 90 degrees, and wherein meander turns of the first designated meander pattern are staggered relative to meander turns of the second designated meander pattern, wherein the plurality of power dividers sums the plurality of representative power signals into a single calibration signal; and a plurality of RF cables, each of the plurality of RF cables couples a given phase shifter output port to its corresponding radiator cluster of its corresponding radiator column, wherein the plurality of RF cables have the same length.

2. The antenna of claim 1, wherein each of the plurality of radiator columns comprises a plurality of crossed dipoles, wherein each of the crossed dipoles has a first dipole at a first polarization orientation and a second dipole at a second polarization orientation, wherein the first dipole is coupled to a first phase shifter and the second dipole is coupled to a second phase shifter.

3. The antenna of claim 2, wherein each of the radiator clusters comprises two sets of crossed dipoles.

4. The antenna of claim 3, wherein each radiator column comprises five radiator clusters, each phase shifter comprises five output ports, and the subset of the plurality of phase shifter output traces comprises four phase shifter output traces.

5. The antenna of claim 1, wherein the plurality of power dividers comprises a plurality of Wilkinson power dividers.

6. The antenna of claim 1, wherein each subset of the plurality of phase shifter output traces comprises a distinct designated meander pattern.

7. The antenna of claim 6, wherein each distinct designated meander pattern comprises one or more meander turns, each meander turn having a meander turn width and a meander turn spacing, wherein the meander turn width and meander turn spacing mitigate coupling within the corresponding phase shifter output trace.

8. The antenna of claim 7, wherein the designated meander patterns of adjacent phase shifter output traces within the subset of phase shifter output traces comprise staggered meander turns to mitigate cross coupling between the corresponding phase shifter output traces.

9. The antenna of claim 8, wherein the designated meander patterns of adjacent phase shifter output traces within the subset of phase shifter output traces comprise one or more chamfers.

* * * * *